T. H. GROZIER.
APPARATUS FOR THE RECLAIMING OF USED PRINTERS' ROLLER COMPOSITION.
APPLICATION FILED NOV. 10, 1919.

1,344,270.

Patented June 22, 1920.
3 SHEETS—SHEET 1.

Inventor
T. H. Grozier.
By H. R. Kerslake
Attorney

T. H. GROZIER.
APPARATUS FOR THE RECLAIMING OF USED PRINTERS' ROLLER COMPOSITION.
APPLICATION FILED NOV. 10, 1919.

1,344,270.

Patented June 22, 1920.
3 SHEETS—SHEET 2.

Inventor
T. H. Grozier,
By H. R. Kerslake.
Attorney

T. H. GROZIER.
APPARATUS FOR THE RECLAIMING OF USED PRINTERS' ROLLER COMPOSITION.
APPLICATION FILED NOV. 10, 1919.

1,344,270.

Patented June 22, 1920.
3 SHEETS—SHEET 3.

Inventor
T. H Grozier,

By H. R. Kerslake
Attorney

UNITED STATES PATENT OFFICE.

THOMAS HAMILTON GROZIER, OF LONGUEVILLE, NEAR SYDNEY, NEW SOUTH WALES, AUSTRALIA.

APPARATUS FOR THE RECLAIMING OF USED PRINTERS' ROLLER COMPOSITION.

1,344,270. Specification of Letters Patent. Patented June 22, 1920.

Original application filed June 13, 1918, Serial No. 239,822, now Patent No. 1,321,789. Divided and this application filed November 10, 1919. Serial No. 337,044.

*To all whom it may concern:*

Be it known that I, THOMAS HAMILTON GROZIER, a subject of Great Britain, residing at "Ventnor," Mary street, Longueville, near Sydney, in the State of New South Wales, Commonwealth of Australia, have invented certain new and useful Improvements in Apparatus for the Reclaiming of Used Printers' Roller Composition, of which the following is a specification.

This invention relates to apparatus for the reclaiming of used printers' roller composition, and has for its object the production of a device for the speedy and efficient separation and recovery of the unspent portion of the composition from the residuum.

In known processes, the used composition is treated in either a closed jacketed vessel in which steam is supplied to the jacket to heat the vessel and its contents, to melt the liquefiable portion thereof, or it is treated in a closed vessel wherein the heating of the mass is effected by supplying saturated steam to the contents in order to accomplish the same object.

In these above mentioned treatments considerable pressure of steam is required to efficiently and expeditiously carry out the operation of liquefication. This necessitates strong and expensive apparatus both for the steam boiler used for the purpose, and for the apparatus itself in which the treatment of the composition is carried out.

Apart from the objections above mentioned in respect to the cost of the providing of strong vessels to generate and to contain the high pressure steam, in the latter mode of treatment, viz:—the direct application of saturated steam to the contents, the water of condensation produced by such treatment, causes a waterlogging of the liquefied composition and the excess moisture thus added is required to be driven off in order to render the composition fit for commercial use. The presence of the excess moisture above referred to invariably causes mold and rot to attack the composition so waterlogged.

In each case too, the liquefiable and the unliquefiable portions of the composition are intimately associated at the completion of the operations, and the unliquefiable portion is required to be separated from the liquid portion in a more or less cumbersome and expensive manner.

By the use of my process the above named objectionable features are eliminated. The used composition is so treated that the unspent liquefiable portion is rapidly and efficiently separated by liquefication from the unspent unliquefiable portion and this is effected without the addition to the recovered composition of any surplus moisture. Furthermore, the liquefiable portion is separated from the residuum.

My process as herein described (which forms the subject matter of my copending application 239,822, filed June 13, 1918, of which the present case is a division, which parent case has matured into Patent No. 1,321,789 November 11, 1919) consists in the application of superheated low pressure steam whereby apparatus of light and consequently cheap construction is used to effect the liquefication of the unspent portion, with its consequent separation from the residuum of the composition. It also refers to the casting or molding into small units or blocks of the recovered liquid composition for ready handling and for rapid seasoning.

A form of apparatus forming the subject matter of the present case is illustrated in the accompanying sheets of explanatory drawings.

Figure 1:
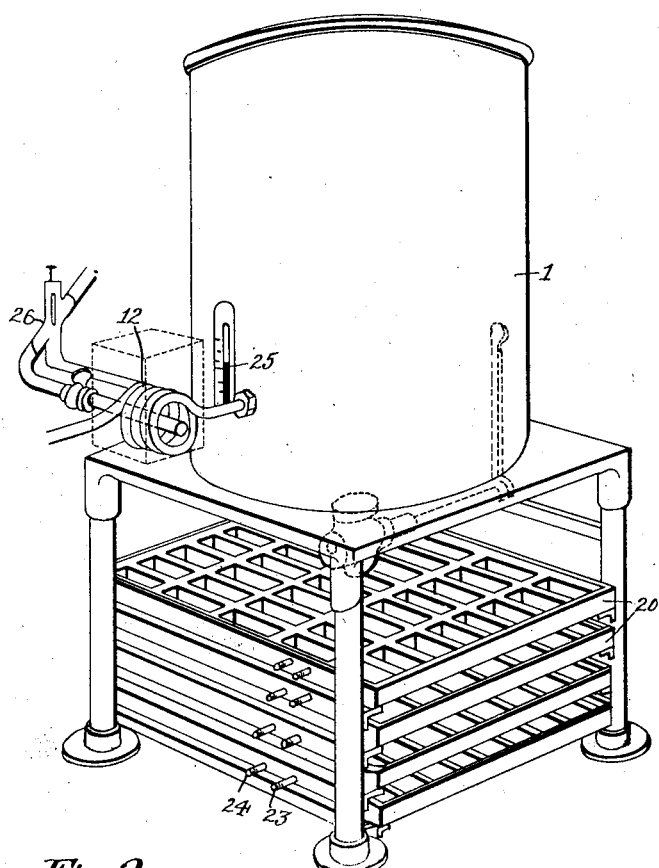
Figure 1 is a perspective view of the apparatus used for the thermal treatment of the used composition.
Figure 2:
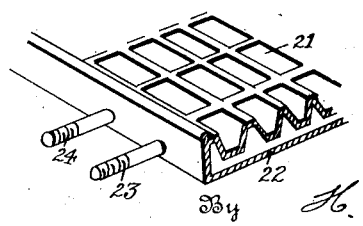
Fig. 2 is a perspective fragmentary plan of the casting mold tray and also showing one unit of the material removed from its mold. In this view the casting mold tray is shown supplied with a water cooling device or jacket, to expedite cooling of the contents of the molds.
Figure 3:
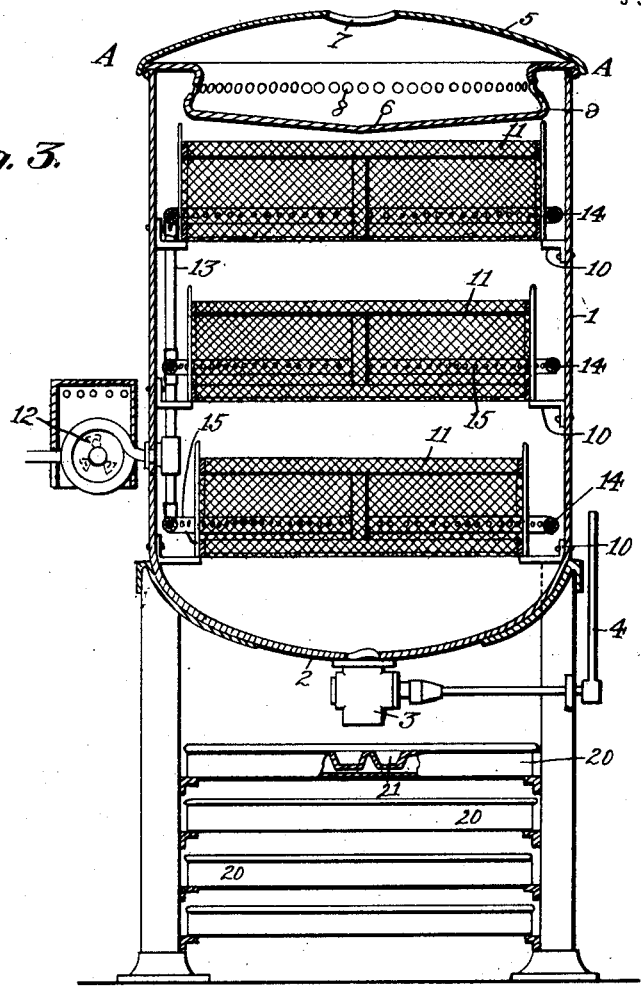
Fig. 3 is a vertical section of one form of the apparatus.
Figure 4:
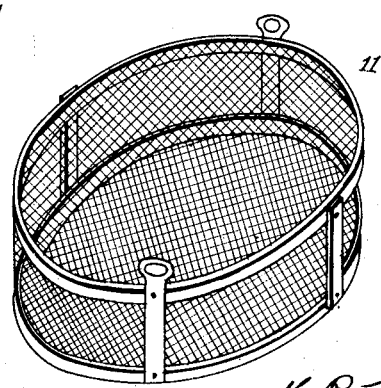
Fig. 4 is a perspective view of one of the cages or foraminous receptacles in which the used printers' roller composition is loaded into the vessel.
Figure 5:
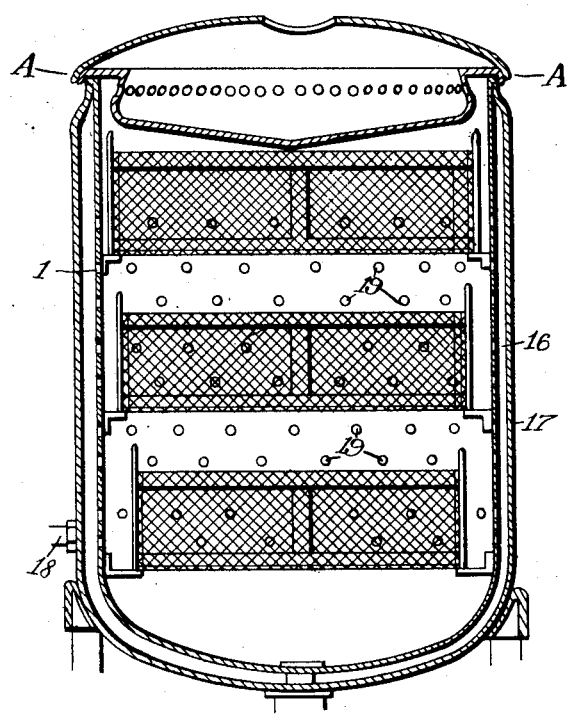
Fig. 5 is a vertical section through an alternative form of apparatus.
Figure 6:
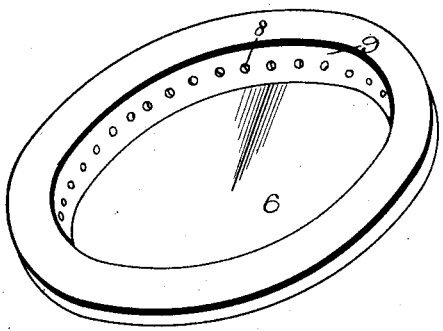
Fig. 6 is a perspective plan view of the condensed water catchment and evaporator taken on plane A—A of Fig. 5.

1 is the barrel of the apparatus which is provided with a dished bottom 2 and drain cock 3, the latter operated by the handle 4. The cover of the apparatus is formed in two disassociatable parts 5 and 6 and forms a vapor proof joint when positioned as shown in Figs. 3 and 5. It also is a catchment for the waters of condensation, and an evaporator for such.

The upper portion or cover proper is preferably domed or cone-shaped to promote rapid draining of the condensed water particles which lodge on its inner surface. An aperture 7 for the escape of vapor is formed as shown. The lower portion 6 is dished to provide a catchment for the retention and for the vaporizing of condensed water, and is provided with apertures or ports 8 in its diagonally positioned circular wall 9 to afford free passage for the escaping steam or vapor from the apparatus. In each case the construction of the cover 5, wall 9, and the dished bottom of 6 provide for rapid drainage of any deposited moisture, to the receptacle formed by such dishing of the catchment 6. 10 are brackets whereon are seated the cages or perforated receptacles 11, for holding the used composition to be treated. These brackets 10 are so proportioned in length as to permit of the withdrawal and replacing of the cages or receptacles 11 freely. The latter are formed of meshed wire or of other convenient construction to permit of ready escape of the fluid portion of the contents therefrom, and the retention of the solid or unliquefiable portion therein.

With reference to Fig. 3 "dried" saturated steam is superheated in the coil 12 by any well known heating medium, such as gas, and flows through the vertical pipe 13 to the horizontally placed ring-shaped pipes 14. These latter are provided with a plurality of orifices or twyers 15 positioned to cause the escaping steam to impinge on to the vertical walls of the cages or receptacles 11 and so come into intimate contact with the contents thereof.

The liquefiable portion of the used composition drips from the cages or receptacles 11 into the dished bottom 2 of the vessel, from whence it is permitted to escape at the completion of the operation by means of the cock 3.

Referring to Fig. 5. This modification illustrates an alternative construction of apparatus whereby the steam pipe service illustrated in Fig. 3 installed within the barrel 1 is dispensed with, and the barrel 1 is formed with a surrounding annular chamber 16 by means of the wall 17 to which the superheated steam is admitted through the pipe 18. A plurality of orifices 19 are provided in the barrel 1 through which the steam from the annular chamber 16 flows into the interior of the vessel. When steam is first admitted to the annular chamber 16 a certain amount of condensation occurs, and the waters of such are drained away into the dished bottom. Upon the subsequent rise in temperature in the apparatus waters of condensation are vaporized, or such waters may be drained away through the valve 27. The used composition is contained in similarly constructed cages or receptacles to those above described.

The casting or molding trays 20 are each formed with a plurality of receptacles 21 into which the hot liquid composition is permitted to flow, the upper ones being removed before "casting" and superimposed one by one above the lowermost, when the filling of that has been accomplished, until the uppermost one is charged, or vice versa.

The composition thus recovered is allowed to cool off in the molds when it is readily removed therefrom by upsetting. Cooling is expedited by circulating water within the water chamber 22 by means of the service pipes 23 and 24.

The unliquefiable part of the used composition, comprising string and such like impurities, together with those portions of the composition impregnated with ink by which a skin or such like is formed, thus rendering them unliquefiable, remains in the bottom of each cage or receptacle. This is subsequently removed therefrom when the latter is withdrawn from the apparatus for cleaning purposes.

The water of condensation which deposits in the catchment 6 is rapidly evaporated by the superheated steam within the chamber impinging on the lower surface thereof, and so no accumulation of water therein is possible, the vapor so formed escaping to the atmosphere through the orifice 7.

In operation the used printers' roller composition is packed into the cages or receptacles 11 in conveniently sized pieces and the cages or receptacles are positioned within the apparatus as shown. The cover 5 and catchment 6 are positioned on the apparatus as shown, and superheated steam of a pressure of from 1 to 10 lbs., to the square inch is admitted to the interior of the apparatus.

The steam is superheated from its saturated steam temperature of 213° F., to 240° F., to about from 300° to 350° F., or more, care, however, being taken by the thermometer reading to insure that injury is not done to the composition by overheating it above the volatilizing temperature of glycerin. For that purpose a thermometer 25 is installed on the superheated steam admission pipe, and a uniform temperature is maintained by the use of a mercury or such like known governor device 26.

Under the action of the high temperature of the superheated steam the liquefiable portion of the composition is readily and efficiently separated from the unliquefiable portion and that is accomplished without the addition of any moisture thereto from the steam. Further, any excess moisture present in the used composition is vaporized and thus extracted from the composition by virtue of the high temperature and gaseous nature of the superheated steam. Any moisture or water of condensation which is given up by the steam is ultimately caught between the parts 5 and 6 and falling into the catchment tray 6 is vaporized by the heat of the contained superheated steam in the chamber. Further, owing to the lowness of the pressure of the steam employed, the apparatus used is cheaply constructed.

By the molding of the resultant composition into small units, ease of handling is effected and the material so cast is found to "season" or mature more readily than if cast in large pieces.

It is obvious that the process above described is useful for the separation of liquefiable from unliquefiable portions in like or kindred substances or compositions, wherein it is desirable to effect such separation without the addition to the liquefied portion of waters of condensation.

I claim:

1. Apparatus for the purpose specified, comprising a closed vessel or chamber provided with a perforated receptacle or cage for the reception of used printers' roller composition or analogous substance, heated with superheated steam of low pressure, admitted thereto in a series of streams or jets, with the object of liquefying the recoverable portion thereof and the retention within the said cage or receptacle of the solid or unliquefied portion for future removal, means for draining the chamber and apparatus comprising a cover or lid and moisture catchment adapted to intercept and vaporize the water of condensation, and such cover or lid provided with an exit port to permit of the escape of such vapors to the atmosphere, substantially as described.

2. In combination, a closed vessel provided with one or more perforated cages or receptacles for the reception of used printers' roller composition, arranged therein, a closure lid for such receptacle, adapted to vaporize intercepted waters of condensation and to discharge such vapor into the atmosphere, a discharge cock or valve, and a steam service, for leading to the interior of the vessel a supply of superheated steam of low pressure, as and for the purposes described and illustrated.

3. In apparatus for the purposes described, a closure lid comprising a cover, furnished with a vapor exit at its apex, and a water catchment and vaporizer positioned below it, consisting of a dished vessel, wherein are formed, above its lower part, a series of ports for the passage of exhaust steam from the apparatus to the closure cover for the retention and vaporizing of the water of condensation trapped therein, substantially as described.

In testimony whereof I affix my signature.

THOMAS HAMILTON GROZIER.